United States Patent
O'Steen et al.

(10) Patent No.: US 7,231,448 B1
(45) Date of Patent: Jun. 12, 2007

(54) SYSTEM AND METHOD FOR AUTOMATED NETWORK ELEMENT DATABASE POPULATION

(75) Inventors: Roberta R. O'Steen, Senoia, GA (US); Linda Reddick, Marietta, GA (US); Charles Y. Hodges, Jr., Hoover, AL (US); Jon Timothy Walters, Chattanooga, TN (US); Leslie Huff, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 590 days.

(21) Appl. No.: 10/107,468

(22) Filed: Mar. 26, 2002

(51) Int. Cl.
*G06F 15/16* (2006.01)
(52) U.S. Cl. .................... 709/226; 709/200; 707/104.1
(58) Field of Classification Search ................ 709/226, 709/219, 217, 223, 225, 229, 200–202, 224; 707/1, 9, 10, 104.1, 100, 102; 370/546
See application file for complete search history.

(56) References Cited

U.S. PATENT DOCUMENTS

| 5,907,848 | A * | 5/1999 | Zaiken et al. ................ 707/202 |
|---|---|---|---|
| 6,664,978 | B1 * | 12/2003 | Kekic et al. ................. 715/733 |
| 6,788,315 | B1 * | 9/2004 | Kekic et al. ................. 709/203 |
| 6,880,086 | B2 * | 4/2005 | Kidder et al. ................ 713/191 |
| 2001/0042104 | A1 * | 11/2001 | Donoho et al. ............. 709/207 |
| 2002/0027504 | A1 * | 3/2002 | Davis et al. ................. 340/540 |
| 2002/0165961 | A1 * | 11/2002 | Everdell et al. ............ 709/225 |
| 2003/0074372 | A1 * | 4/2003 | Barchi et al. ............. 707/104.1 |
| 2003/0120822 | A1 * | 6/2003 | Langrind et al. ........... 709/251 |
| 2003/0126195 | A1 * | 7/2003 | Reynolds .................... 709/203 |
| 2003/0202645 | A1 * | 10/2003 | Naik et al. ................ 379/201.1 |
| 2005/0004978 | A1 * | 1/2005 | Reed et al. ................. 709/203 |

OTHER PUBLICATIONS

Authur Unknown. "IBM Informix JDBC Driver: Programmer's Guide". IBM Corporation. Aug. 2001.*

* cited by examiner

*Primary Examiner*—Moustafa M. Meky
(74) *Attorney, Agent, or Firm*—Withers & Keys LLC

(57) ABSTRACT

In an illustrative method for populating a database for use in automated administration of network elements, data that describes network elements in a telecommunication system is aggregated from existing systems. The aggregated network element data is validated and inserted into a database. Finally, a log is generated for each database entry.

8 Claims, 5 Drawing Sheets

US 7,231,448 B1

SYSTEM AND METHOD FOR AUTOMATED NETWORK ELEMENT DATABASE POPULATION

FIELD OF THE INVENTION

The present invention relates generally to telecommunications systems, and more particularly, to systems and methods for managing network elements.

BACKGROUND

Telecommunication systems comprise numerous network elements, such as switches, multiplexers, etc., which operate together to provide telephone service, digital subscriber lines, etc. Generally, the number of network elements in a telecommunication system is very large—on the order of tens of thousands. Accordingly, the companies that provide telecommunication services have developed systems to track information about the many network elements that have been deployed. Indeed, over the years, telecommunication service providers have installed numerous systems for tracking various aspects of the network elements in their systems.

Recently, systems have been developed that allow for automated remote control of network elements. Using these systems, administrators of telecommunication systems can quickly and easily perform system administrative tasks such as, for example, provisioning. However, before a system for remote control of network elements can be used, typically the system must be loaded with data regarding the network elements that are to be managed. Of course, the network element data that is needed for these systems is frequently located in the legacy systems that the telecommunication companies have previously installed. Unfortunately, there are not presently available systems and methods for populating new systems with the network element data from the installed legacy systems.

SUMMARY

Accordingly, Applicants have developed systems and methods for loading network element data into a database for use by a system for automated administration of network elements. In an illustrative method, data that describes network elements in a telecommunication system is aggregated from existing systems. The aggregated network data is validated and inserted into a database. Finally, a log is generated for each database entry.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which.

DETAILED DESCRIPTION

Figure 1:
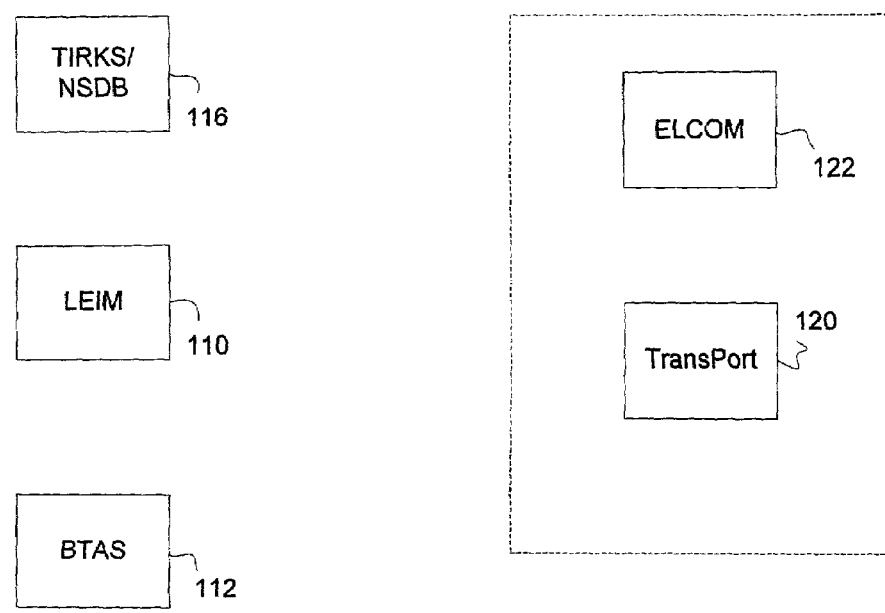
FIG. 1 is a block diagram of systems used to administer a telecommunication system.

FIG. 1 is a block diagram representing systems for use in managing network elements in a telecommunications system. Loop Equipment Inventory Module System (LEIMs) 110 comprises a database of the network elements that are employed to provide service between central offices (CO's) and customer locations. Telemetry Assignment System (TAS) 112 comprises a database of numbers that have been assigned to network elements to uniquely identify each network element. The Trunk Integrated Record Keeping System (TIRKS)/Network and Services Database (NSDB) 116 has two functions. It is used to assign and maintain records of facilities and equipment associated with services requiring design transmission conditioning. It also stores customer and circuit data for special services, message carrier, and enhanced non-design services.

Generally, LEIMs 110, TAS 112, and TIRKS/NSDB 116 are data tracking and management systems. While they provide for managing information relevant to the network elements, they are not operable to interact with the network elements to implement administrative functions. Conversely, Transport 120 and ELCOM 122, which are software systems produced by Telcordia, may be employed to automatically implement administrative functions such as updating network element provisioning. However, before these systems can be used to administer a system, they must be loaded with data regarding the network elements. A method for loading network element data from systems such as for example, LEIMs 110, TAS 112, and TIRKS/NSDB 116 into an automated administration system such as, for example, Transport 120 is described below in connection with FIG. 3.

Figure 2:
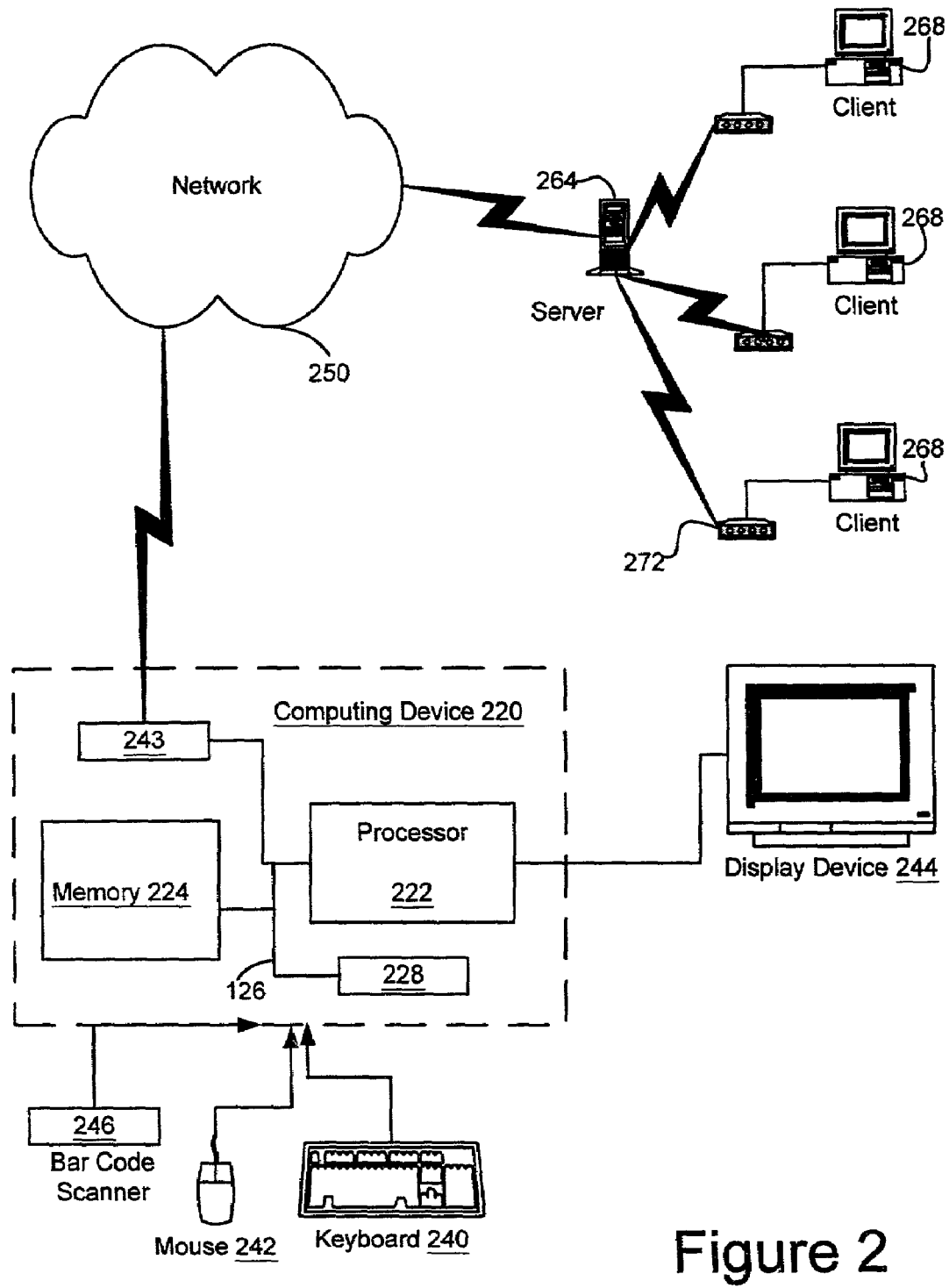
FIG. 2 is a diagram of a system for use in implementing a method for populating a database.

FIG. 2 is a diagram of a generic computing system in which an illustrative method for loading data may be implemented. As shown in FIG. 2, computing device 220 includes processor 222, system memory 224, and system bus 226 that couples various system components including system memory 224 to processor 222. System memory 224 may include read-only memory (ROM) and/or random access memory (RAM). Computing device 220 may further include hard-drive 228, which provides storage for computer readable instructions, data structures, program modules, data, and the like. A user (not shown) may enter commands and information into the computing device 220 through input devices such as a keyboard 240, a mouse 242, and a bar code scanner 246. Display device 244 may also include other devices such as a touch screen, a light pen, a grid of light beams, or the like for inputting information into processor 222. A display device 244, such as a monitor, a flat panel display, or the like is also connected to the computing device 220 or output. Communications device 243, which may be a modem, network interface card, or the like, provides for communications over network 250. Processor 222 can be programmed with instructions to interact with other computing systems so as to perform the methods described below. The instructions may be received from network 250 or stored in memory 224 and/or hard drive 228. Processor 222 may be loaded with any one of several computer operating systems such as WINDOWS NT operating system, WINDOWS 2000 operating system, LINUX operating system, and the like.

As shown in FIG. 2, computing device 220 may be connected to computer network 250. Server 264 is likewise operable to communicate with other computing devices over network 250. Network 250 may be the Internet, a local area network, a wide area network, or the like. Server 264 may communicate e-mails, web pages, and other data. Server 264 may be operated by an ISP, a corporate computer department, or any other organization or person with a server connected to network 250. Server 264 is accessible by client stations 268 from which users may send and receive data and browse web pages. Client stations 268 may connect to servers via a local area network (not shown) or using a remote connection device 272 such as, for example, a modem or network interface card.

Figure 3:
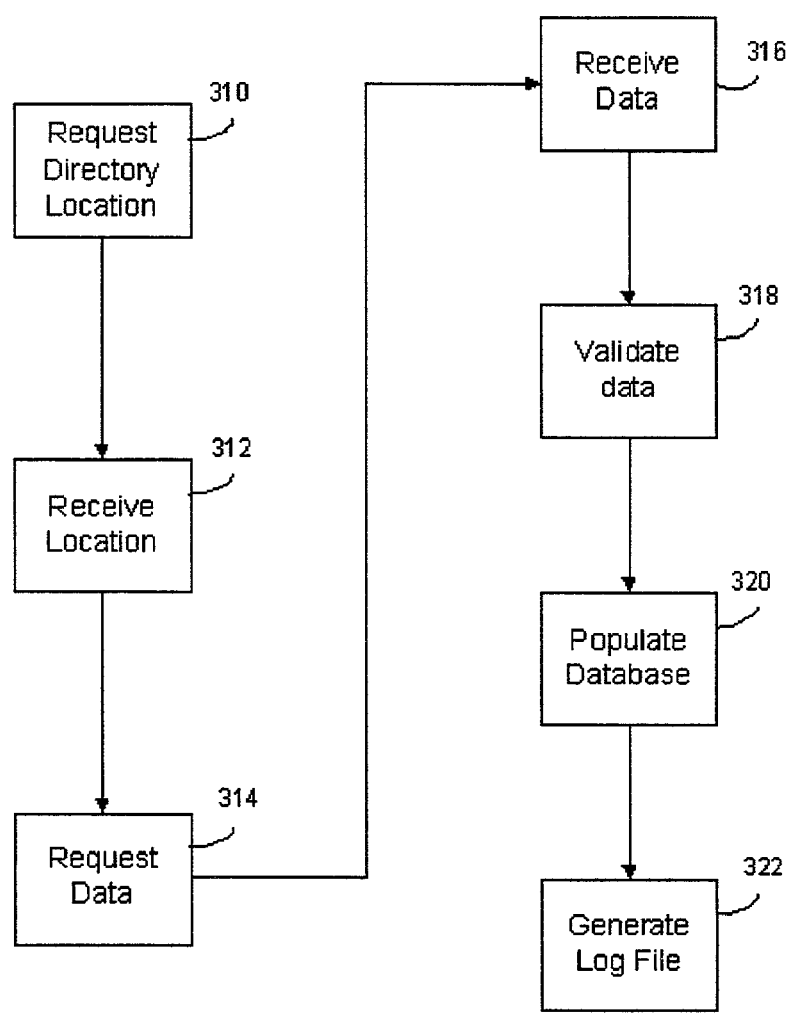
FIG. 3 is a flow chart of a method for populating a database.
Figure 4:
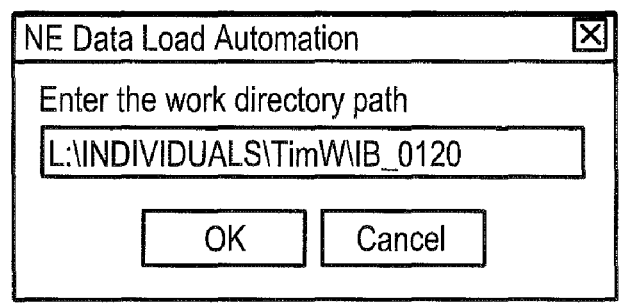
FIG. 4 is a diagram of a display for retrieving a directory location.

The illustrative computing system described above may be used to implement an illustrative method for preparing data for use in a system for automatically performing administrative tasks such as is described in FIG. 3. As shown, at step 310, a request is made for the directory location of the network element related data that is to be loaded into the administrative system. For example, a screen such as disclosed in FIG. 4 may be displayed to the user on display device 244 whereby the user may input a directory location. At step 312, the directory location of the network element data is received. For example, a user input identifying a directory location and made using keyboard 240 or mouse 242 may be received into device 220.

At step 314, the network element data is requested, and at step 316 is received. For example, a command may be issued by processor 222 to read data from memory 224 or hard drive 228. The network element data corresponds to attributes of the network elements such as, for example, the network element location, the network element vendor, the network element model, and the network element type.

At step 318, the network element data received at step 316 is validated. To be validated, the data network element data may be required to be both recognizable and/or consistent. For example, the received network element type may be required to be data included in a predetermined set of recognized data. Additionally, the received network element vendor may be required to be data included in a predetermined set of recognized data based on the received network element type.

Figure 5:
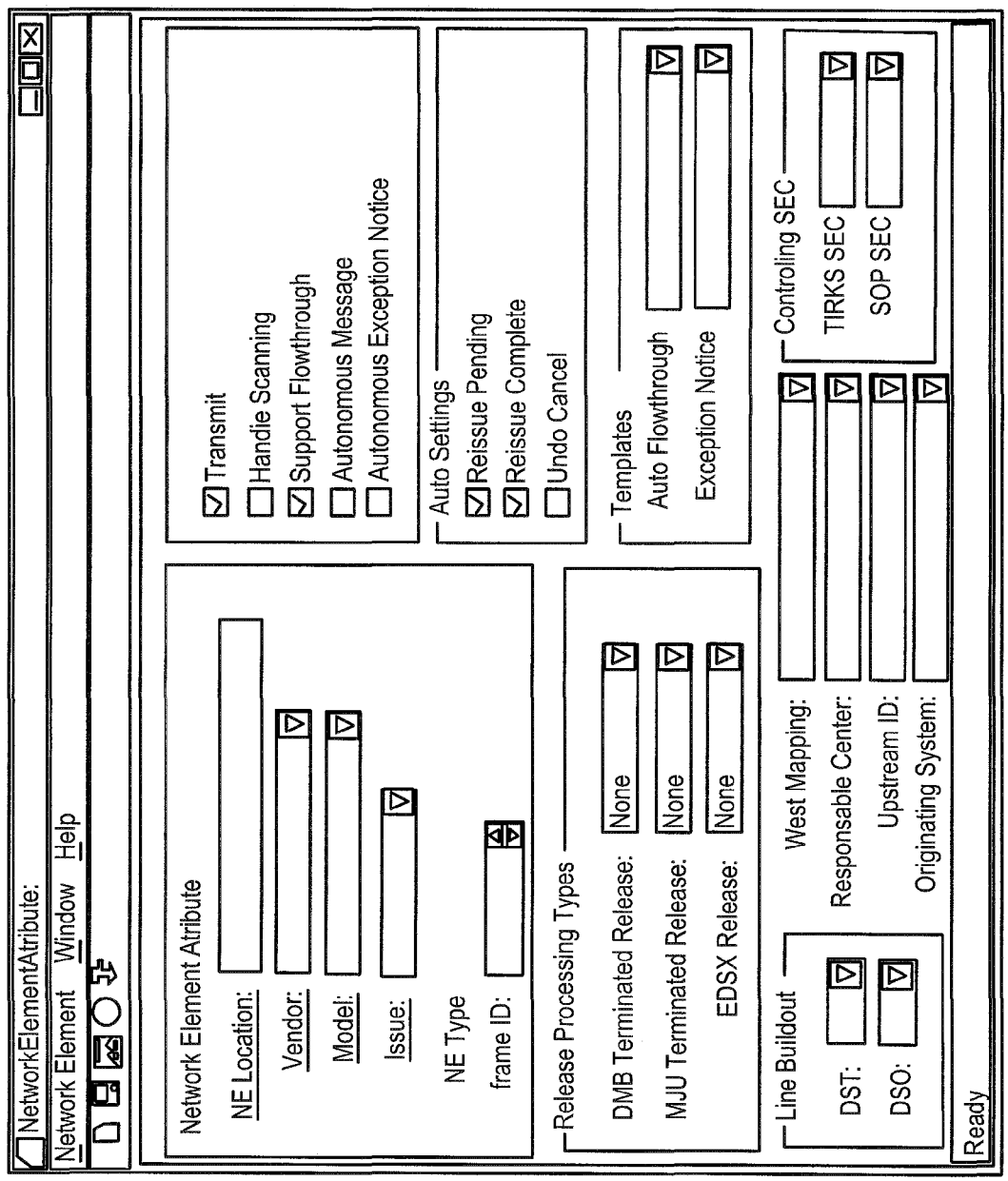
FIG. 5 is a diagram of a graphical user interface for populating a database.

At step 320, the network element data is inserted into a database such as, for example, the transport database. The data may be inserted into the database using a graphical user interface such as, for example, the graphical user interface for the Transport software system shown in FIG. 5. At step 322, a log file of each database entry is generated. The log file may indicate whether each entry was successful, was skipped or left incomplete, or was erroneous. An erroneous entry may be accompanied by an error message indicating the source of the error such as, for example, an invalid data entry or a record that already exists in the database.

Thus, illustrative systems and methods for populating a database for use by a system for automatically performing network element administrative tasks have been disclosed. Systems and methods in accordance with the invention facilitate the loading of data that otherwise might need to be loaded manually at great effort and expense. Thus, systems and methods in accordance with the invention mark an advance in the administration of telecommunication networks.

Those skilled in the art understand that computer readable instructions for implementing the above-described processes, such as those described with reference to FIG. 3 can be generated and stored on one of a plurality of computer readable media such as a magnetic disk or CD-ROM. Further, a general purpose computer such as that described with reference to FIG. 2 may be arranged with other similarly equipped computers in a network, and may be loaded with computer readable instructions for performing the above described processes. Specifically, referring to FIG. 2, microprocessor 222 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with transport element databases, the systems and methods may be employed to populate databases for use with other systems as well. Accordingly, reference should be made to the appended claims as indicating the scope of the invention.

What is claimed is:

1. A method for automated loading of network element data, comprising:
    receiving network element data, the network element data corresponding to attributes of network elements in a telecommunication system;
    validating the network element data;
    inserting the valid network element data into a database that enables automated control of the network elements in the telecommunication system; and
    generating a log file of each network element data entry wherein the log file comprises a log of successful data entries, skipped or incomplete data entries, and erroneous data entries and wherein an error message is included for each log of erroneous data entries wherein at least one log of an erroneous data entry includes an error message indicating that invalid data was entered and at least one log of an erroneous data entry includes an error message indicating that a record already exists in the database.

2. The method of claim 1, wherein said step of validating the network element data comprises validating that the received data corresponding to a network element attribute comprises data included in a predetermined set of recognized data.

3. The method of claim 2, wherein said step of validating the network element data comprises validating that the received data corresponding to a network element attribute comprises data included in a predetermined set of recognized data based on the received data corresponding to another network element attribute.

4. The method of claim 1, further comprising requesting a directory location of the network element data to be loaded.

5. The method of claim 1, further comprising retrieving the network element data from the directory location.

6. A computer readable medium having computer executable instructions recorded thereon for performing the method recited in claim 1.

7. A system for automated loading of network element data, comprising:
    a processor operative to execute computer executable instructions; and
    a memory having stored therein computer executable instructions for performing the following steps:
    receiving network element data, the network element data corresponding to attributes of network elements in a telecommunication system;
    validating the network element data;

inserting the valid network element data into a database that enables automated control of the network elements in the telecommunication system; and generating a log file of each network element entry wherein the log file comprises a log of successful data entries, skipped or incomplete data entries, and erroneous data entries and wherein an error message is included for each log of erroneous data entries wherein at least one log of an erroneous data entry includes an error message indicating that invalid data was entered and at least one log of an erroneous data entry includes an error message indicating that a record already exists in the database.

8. A method for automated loading of network element data, comprising:

receiving a plurality of data entries associated with network element data stored in a loop equipment inventory module;

generating a log file in response to receiving the plurality of data entries wherein the log file comprises a log of successful data entries, skipped or incomplete data entries, and erroneous data entries and wherein an error message is included for each log of erroneous data entries wherein at least one log of an erroneous data entry includes an error message indicating that invalid data was entered and at least one log of an erroneous data entry includes an error message indicating that a record already exists in the database;

for each data entry, determining whether the data entry is valid;

if the data entry is valid, then inserting it into a transport database that enables automated control of the network elements in the telecommunication system; and if the data entry is invalid, then:

inserting the data entry in the log file that includes the erroneous data entries; and generating an error message that indicates why the data entry is invalid, wherein the error message specifies either that there is invalid data for the data entry or that a record already exists for that data entry.

\* \* \* \* \*